(12) United States Patent
Reyes

(10) Patent No.: US 7,709,740 B2
(45) Date of Patent: May 4, 2010

(54) FLAME RETARDANT WIRE AND CABLE

(75) Inventor: Jose D. Reyes, Newtown, PA (US)

(73) Assignee: JJI Technologies, LLC, Mandeville, LA (US)

( * ) Notice: Subject to any disclaimer, the term of this patent is extended or adjusted under 35 U.S.C. 154(b) by 328 days.

(21) Appl. No.: 11/745,041

(22) Filed: May 7, 2007

(65) Prior Publication Data

US 2008/0277136 A1   Nov. 13, 2008

(51) Int. Cl.
   *H01B 7/00* (2006.01)
(52) U.S. Cl. .............................. 174/110 R; 174/120 R; 174/121 R; 174/121 A
(58) Field of Classification Search ............. 174/110 R, 174/110 A, 110 AR, 110 SR, 110 N, 110 PM, 174/110 FC, 119 R, 119 C, 120 R, 121 R, 174/121 AR
See application file for complete search history.

(56) References Cited

U.S. PATENT DOCUMENTS

| | | | |
|---|---|---|---|
| 5,204,393 | A | 4/1993 | Nalepa |
| 5,356,568 | A | 10/1994 | Levine |
| 6,031,032 | A | 2/2000 | Horacek et al. |
| 6,228,914 | B1 | 5/2001 | Ford et al. |
| 6,733,697 | B2 | 5/2004 | Rhodes et al. |
| 6,852,412 | B2 | 2/2005 | Keogh |
| 6,852,921 | B1 * | 2/2005 | Koike et al. ............... 174/36 |
| 6,924,334 | B1 * | 8/2005 | Fukatani et al. ............. 524/445 |
| 7,202,418 | B2 | 4/2007 | Glew |
| 2002/0098357 | A1 | 7/2002 | Keogh |
| 2003/0114606 | A1 * | 6/2003 | Taniguchi et al. ........... 525/523 |
| 2003/0141097 | A1 * | 7/2003 | Belli et al. .............. 174/110 R |
| 2004/0012004 | A1 | 1/2004 | Rhodes et al. |
| 2006/0237215 | A1 * | 10/2006 | Alexander et al. ...... 174/110 R |

FOREIGN PATENT DOCUMENTS

| | | |
|---|---|---|
| EP | 0494778 B2 | 9/1992 |
| EP | 1026700 A2 | 1/2000 |
| JP | 06275135 A1 | 9/1994 |
| WO | 9845364 B1 | 10/1998 |
| WO | 2004033196 A1 | 4/2004 |
| WO | 2004044049 A2 | 5/2004 |

OTHER PUBLICATIONS

Partial European Search Report Issued Aug. 22, 2008.

* cited by examiner

*Primary Examiner*—William H Mayo, III
(74) *Attorney, Agent, or Firm*—Edwin A. Sisson, Attorney at Law, LLC

(57) ABSTRACT

Flame retardant non-halogenated thermoplastics for use in the ultra thin insulative wall of a cable are disclosed. Suitable thermoplastics include polyamides, including polyamides comprising a repeating unit of amino caproic acid or A-D, wherein A is a residue of a dicarboxylic acid selected from the group consisting of adipic acid, isophthalic acid, terephthalic acid, 1,4-cyclohexanedicarboxylic acid, rescorcinol dicarboxylic acid, naphthalenedicarboxylic acid, and mixtures thereof, and wherein D is a residue of a diamine selected from the group consisting of m-xylylene diamine, p-xylylene diamine, hexamethylene diamine, ethylene diamine, or 1,4 cyclohexanedimethylamine, and mixtures thereof. Suitable flame retardants disclosed include nitrogenous phosphate and a nitrogenous sulfonate, and mixtures thereof, and ethylene diamine phosphate. The insulative wall of the cable may also include hydrotalcite or hydrotalcite-like compounds and metal deactivators such as 1,2bis(3,5-di-tert-butyl-4-hydroxyhydrocinnamoyl)hydrazine.

25 Claims, 4 Drawing Sheets

Exemplary 2,4,8,10-tetraoxaspiro[5.5]undecane Compounds (Part 2)
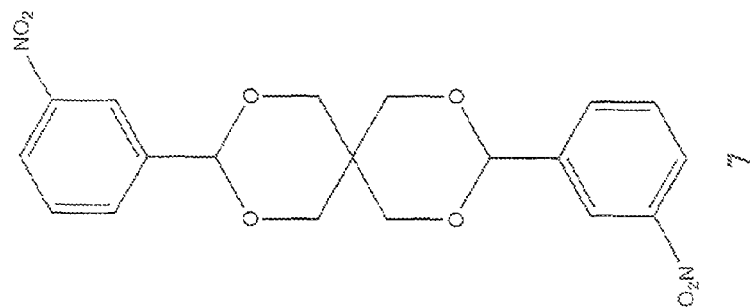
7
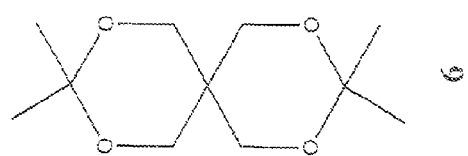
6
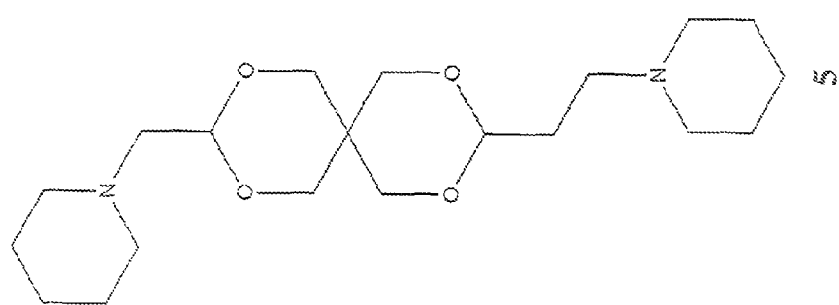
5
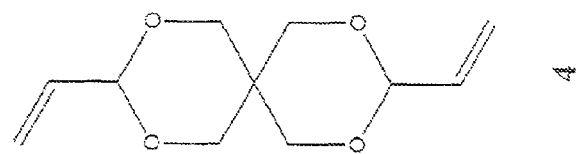
4
Figure 1B

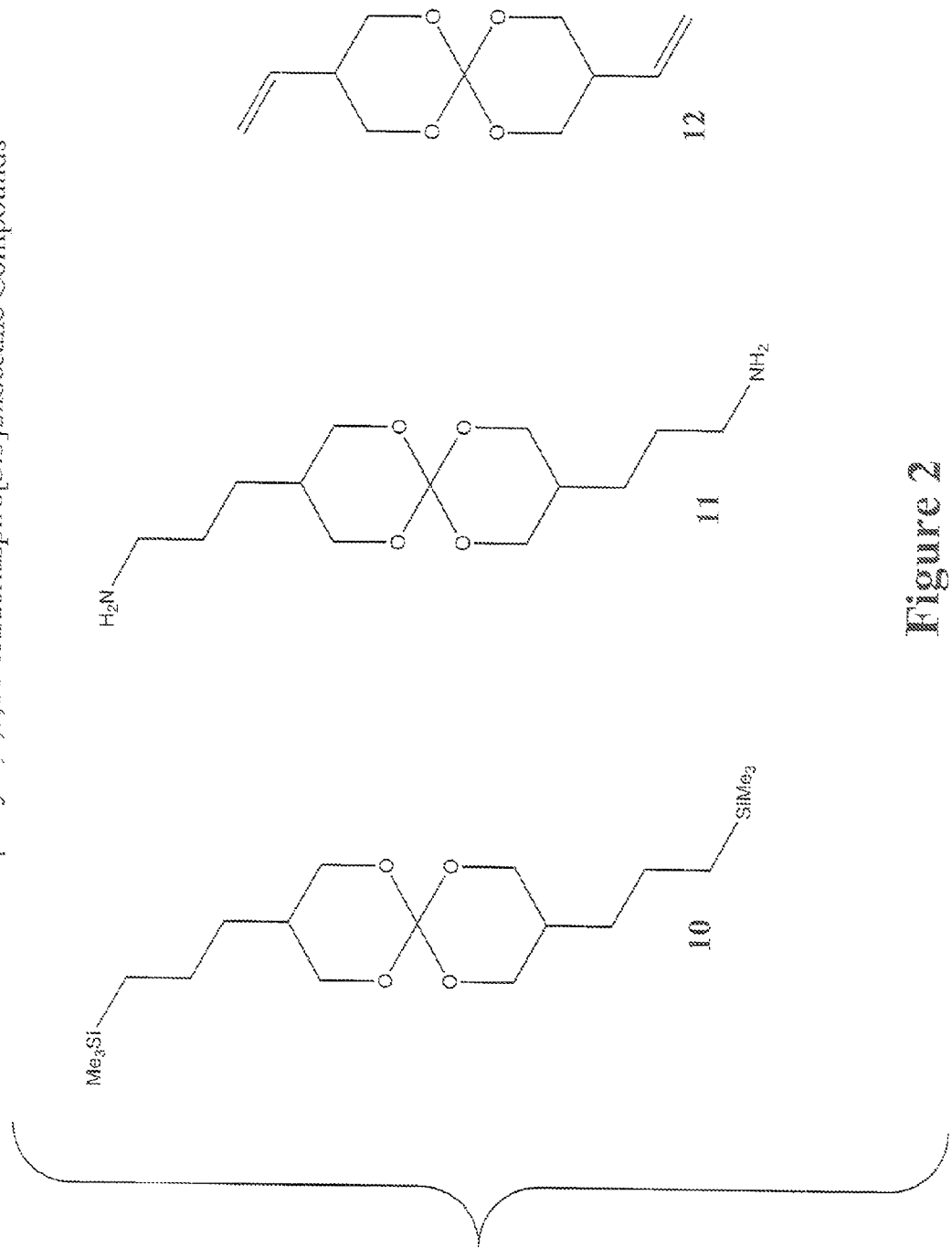
Figure 2. Exemplary 1,5,7,11-tetraoxaspiro[5.5]undecane Compounds

FLAME RETARDANT WIRE AND CABLE

TECHNICAL FIELD

This invention relates to cables and wiring.

BACKGROUND

Cables for conducting electricity or fiber optic transmissions generally have insulative walls to protect the cable. This insulative wall is usually a non-conductive plastic material which is bendable and abrasion resistant. Plastics can be deficient in that when they burn, they can emit harmful gasses or intensify the fire.

Plastics can be made flame retardant with the use of halogenated materials, in particular, brominated compounds. However, their use has come under increasing pressure due to health and environmental concerns. The use of non-halogenated flame retardants in plastics generally has been deficient in that they can require high loading amounts to be effective.

Ultra-thin cable insulation can be difficult to make without using a halogenated compound. Therefore, a need exists for non-halogenated flame retardant commodity plastics, such as polyolefins. In particular, a need exits for insulated thin-walled wire and cable in which the insulation is made of a commodity plastic.

SUMMARY

In some embodiments, a cable comprises a conductor core and an insulative wall. The insulative wall may have a thickness of from about 0.10 mm to about 0.44 mm. When the cable is tested using a flame propagation method described herein (the "Thin Insulative Wall Flame Propagation Test"), a combustion flame of the insulative wall extinguishes within about 70 seconds and a minimum of about 50 mm of insulative wall at a top of a test sample remains unburned. At least about 20% by weight of the total composition of the insulative wall is a thermoplastic selected from the group consisting of polyesters, polyamides, polylactic acids and polyolefins.

In some embodiments, a cable comprises a conductor core and an insulative wall having a thickness of from about 0.110 to about 0.44 mm. When the cable is tested using the Thin Insulative Wall Flame Propagation Test, a combustion flame of the insulative wall extinguishes within about 70 seconds and a minimum of about 50 mm of insulative wall at a top of a test sample remains unburned. At least 20% by weight of the total composition of the total composition of the insulative wall comprises a polyolefin.

In some embodiments, a cable comprises a conductor core and an insulative wall having a thickness of from about 0.10 mm to about 0.44 mm. The insulative wall may comprise a polyolefin and a tetraoxaspiro material or an adduct thereof.

Other features and advantages will be apparent from the description and drawings, and from the claims.

DESCRIPTION OF DRAWINGS

FIG. 1B is a series of structures representing other exemplary 2,4,8,10-tetraoxa-spiro[5.5]undecane compounds.

FIG. 2 is a series of structures representing exemplary 1,5,7,11-tetraoxa-spiro[5.5]undecane compounds.

DETAILED DESCRIPTION

Figure 1A:
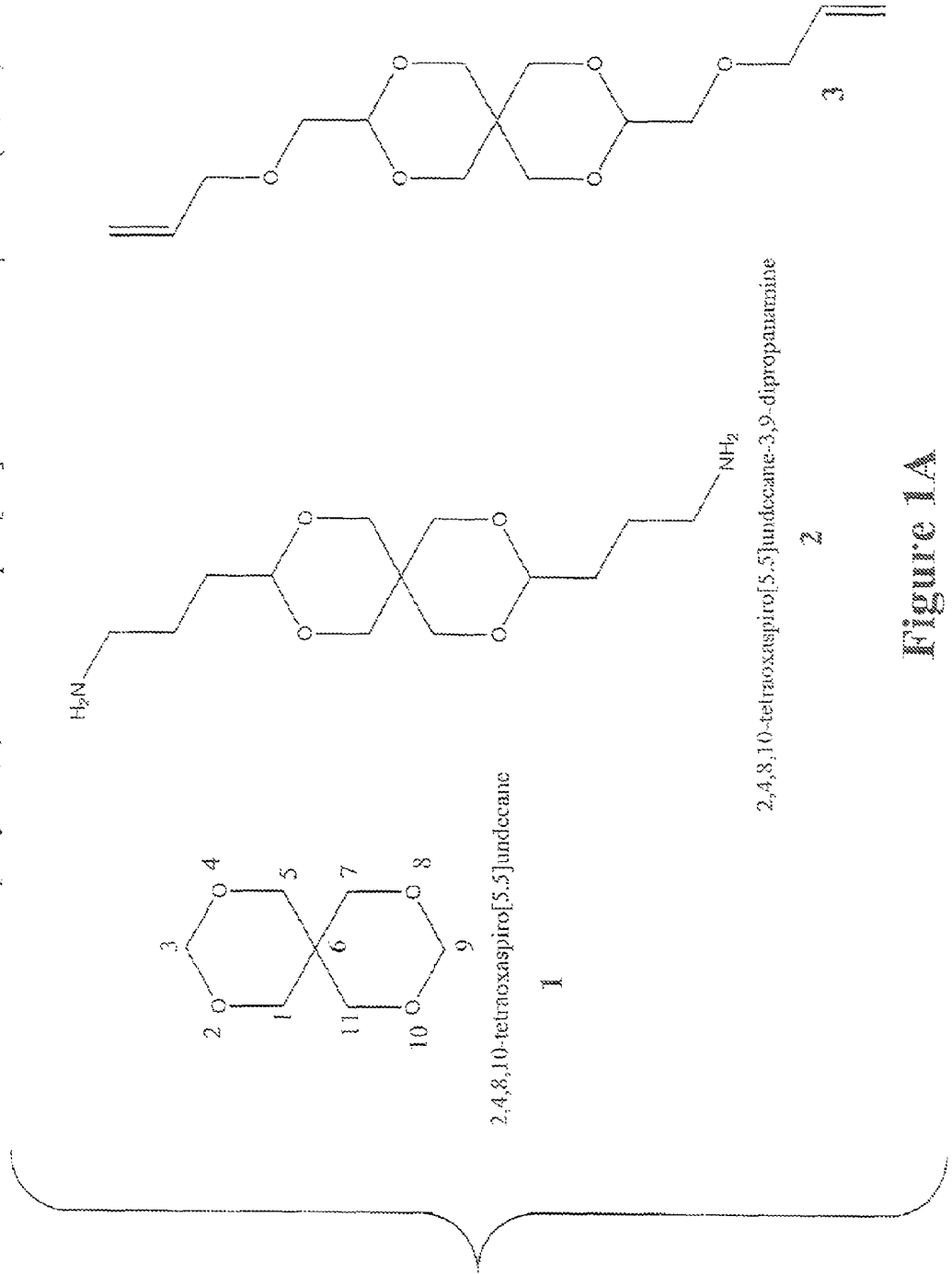
FIG. 1A is a series of structures representing exemplary 2,4,8,10-tetraoxa-spiro[5.5]undecane compounds.

A cable is made from one or more wires. The wire is conductive and is called a conductor. As a non-limiting example, the conductor can conduct heat, light or electricity. The conductor may be copper, aluminum, silver, gold, or some other conductive material. If the cable is for fiber optics, it can be a conductor of light. The cable has an insulative wall which surrounds the conductor, and the insulative wall may be a coating. This insulative wall isolates the electricity, optics or heat passing through the conductor from the surrounding environment.

The insulative wall should possess advantageous properties depending upon the environment in which the cable is used. Flame retardancy is desirable. Because the material in the insulative wall is usually plastic, the material should not burn. If the material does burn, it should do so in a controlled manner and should have minimal combustion by-products. Any combustion products produced should be rendered non-toxic or minimally toxic.

It has been discovered that when the compounds described in this specification are used to make the insulative wall, the resulting cable meets the requirements of ISO 6722, entitled "Road Vehicles—60 V and 600 V single-core cables—Dimensions, test methods and requirements," First edition, Feb. 15, 2002, the disclosure of which is hereby incorporated by reference herein in its entirety.

The first material for the wall can be a thermoplastic. The material may be selected from the group consisting of polyesters, polyamides, polylactic acids, and polyolefins.

Although not limited to the following, examples of polyesters that can be used include those whose acid units are derived from terephthalic acid, isophthalic acid, 2,6 dicarboxylic acid and their respective dimethyl esters. These acids or esters are reacted with one or more glycols which are an aliphatic diol having from about 2 to about 10 carbon atoms, a cycloaliphatic diol having from about 7 to about 14 carbon atoms, an aromatic diol having from about 6 to about 15 carbon atoms, or a glycol ether having from about 4 to about 10 carbon atoms. Suitable diols include, but are not limited to, 1,4-butenediol, trimethylene glycol, 1,6-hexanediol, 1,4-cyclohexanedimethanol, diethylene glycol, resorcinol, and hydroquinone.

One of ordinary skill will recognize these combinations as polybutylene terephthalate (PBT), polyethylene terephthalate (PET), polyethylene isophthalate (PEI), and polyethylene naphthalate (PEN). These are commonly referred to as terephthalates, isophthalates and naphthalates.

Unsaturated polyesters made from different dicarboxylic acids and esters can also be utilized.

Non-limiting examples of polyamides that can be utilized include those that can be described as including the repeating unit of amino caproic acid or A-D, where A is the residue of a dicarboxylic acid that includes adipic acid, isophthalic acid, terephthalic acid, 1,4-cyclohexanedicarboxylic acid, rescorcinol dicarboxylic acid, or naphthalenedicarboxylic acid, or a mixture thereof, and D is a residue of a diamine that includes m-xylylene diamine, p-xylylene diamine, hexamethylene diamine, ethylene diamine, or 1,4 cyclohexanedimethylamine, or a mixture thereof. These polyamides can range in number average molecular weight from about 2000 to about 60,000 as measured by end-group titration. These polyamides can also be described as the reaction product of amino caproic acid with itself and/or the reaction product of a residue of dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof with a residue of a diamine comprising m-xylylene diamine, p-xylylene diamine, hexamethylene diamine, ethylene diamine, or 1,4 cyclohexanedimethylamine, or a mixture thereof.

One of ordinary skill will recognize these combinations as well known polyamides, also called nylons, including, but not limited to, as MXD6, Nylon 6, Nylon 6,6, Nylon 4,6 and Nylon 12.

Polylactic acid and succinic acid-based aliphatic polyesters are biodegradable and can be used in some embodiments to make cable. Polyglycolic acid can be utilized, and it is a crystalline biodegradable resin having a melting point of about 180° C. or higher.

Olefinic polymers or copolymers that can be used include, but not limited to, low density polyethylene, polypropylene, polyethylene, and high density polyethylene. Members of the polyolefin family are: polypropylene, thermoplastic elastomers (rubbers) and polyethylene. Many subset plastic materials within each one of these members of the polyolefin family exist. As a non-limiting example, within polypropylene, there are homopolymer polypropylene, high impact co-polymer polypropylene, random co-polymer polypropylene, atactic polypropylene, crosslinked polypropylene (XLPP), and many others. Many members of the polyethylene family also exist. For example, within the polyethylene family are very low density polyethylene (VLDPE), low density polyethylene (LDPE), medium density polyethylene (MDPE), high density polyethylene (HDPE), linear low density polyethylene (LLDPE), crosslinked polyethylene (XLPE), and ethylene/vinyl acetate copolymer (EVA). Similarly, thermoplastic elastomers may be based on polypropylene or polyethylene backbones and may further contain dispersed rubber domains which are themselves either thermoplastic or thermoset (e.g. dynamically vulcanized).

Copolymers of polypropylene can be particularly desirable. Copolymers of polypropylene are usually made from ethylene and propylene monomers in any of the isotactic, syndiotactic, or atactic forms. The copolymer could be random, as that produced by adding the co-monomer (usually ethylene) directly to the polymerization reactor, and they can be heterophasic, which are usually blends of homopolymer and bi-polymers, which are mainly amorphous copolymers of ethylene/propylene.

In the case of the olefins, the melt flow is preferably in the range of about 1.0 to about 7.0. For processing considerations, higher melt flow polyolefins can be advantageous. In other embodiments, melt flows higher than about 7 are utilized, e.g., about 8 to about –30 or about 10 to about 20.

It is recommended, although not required, that a polypropylene that is a copolymer having the following nominal properties be used:

| PROPERTY | NOMINAL VALUE (Approximate) | UNITS | ASTM TEST METHOD |
|---|---|---|---|
| Melt Flow Rate | 2.0 | g/10 min. | C 1238 |
| Density | 0.9 | g/cm³ | D 1505 |
| Tensile | | | |
| Yield | 24 | MPa | |
| Ultimate Elongation | >700 | % | D 638 |
| Modulus | 1170 | MPa | |
| Flexural Modulus | 1100 | MPa | D 790 |
| Deflection Temperature at 66 psi | 85 | ° C. | D 648 |
| Rockwell Hardness | 75 | R | D 785 |
| Notched Izod @ 23° C. | NB | J/m | D 256 |
| Gardner Impact @ –18° C. | >36 | J | D 5420 |

Such a polypropylene material is available from HUNTSMAN (Woodlands, Tex., USA) and is known as grade 18S2A.

The thermoplastic desirably present in at least 20% by weight of the total composition of the insulative wall. While about 20% may represent a minimum, the thermoplastic may be present as high as about 90% by weight, with any amount in the range of about 20 to about 90% being generally satisfactory. Generally satisfactory results have been obtained when the polyolefin was present in the range of about 30 to about 60% and in the range of about 35 to about 55 weight percent.

The flame retardant properties are achieved by incorporating a flame retardant compound. The flame retardant may be a halogenated compound or a non-halogenated compound, or combinations thereof. In some embodiments, the flame retardant is at least one non-halogenated compound.

Brominated compounds are typical halogenated compounds. While phosphates may be known, phosphates with a char catalyst generally are not. In some embodiments, the flame retardant is desired to be essentially halogen free, which for the purposes of this disclosure means that the composition has less than about 500 ppm by weight of halogen in the total composition. Thus, if a brominated compound is to be used, in some embodiments, to be essentially halogen free, the compound has less than 500 ppm by weight bromine in the total composition.

An often useful flame retardant material includes a nitrogenous phosphate or sulfonate component formed in the presence of a char catalyst. The nitrogenous phosphate or sulfonate component may be formed using any of the conventional techniques with the char catalyst being introduced at least in part prior to the formation of the final product. Alternatively, the char catalyst may be introduced at the formation of the final product. In some embodiments, the char catalyst may be introduced either in total or in part with one or more of the nitrogen containing compounds and then the phosphorus or sulfur containing compound may be reacted. These nitrogenous phosphate or sulfonate components may also be formed by introducing parts of one or more of the reactants in steps. In some embodiments, a portion of the total amount of the nitrogen containing reactant may be added to a portion of the activator followed by a portion of the phosphorus or sulfur containing reactant and then repeated in any order and in as many steps as desired to obtain the final activated flame retardant.

The selection of the nitrogen containing reactant and the phosphorus or sulfur containing reactant used can depend upon the application. Suitable reactants include those known for use in forming nitrogenous phosphate or sulfonate flame retardants, including, but not limited to, ammonium phosphate, ammonium pyrophosphate, ammonium polyphosphate, ethylene-diamine phosphate, piperazine phosphate, piperazine-pyrophosphate, melamine phosphate, dimelamine phosphate, melamine pyrophosphate, guanidine phosphate, dicyanodiamide phosphate urea phosphate, ammonium sulfonate, ammonium polysulfonate, ethylenediamine sulfonate, dimelamine suflonate, quanidine sulfonate, and dicyanodiamide sulfonate. Suitable nitrogen containing reactants include, but are not limited to, ammonium, alkyleneamines (including diamines), triazine, melamine, melam, melem, melon, ammeline, ammelide, 2-ureidomelamine, acetoguanamine, benzoguanamine, quanidine, dicyanodiamide, diamine phenyltriazine or mixtures hereof. Preferred nitrogen containing reactants include, but are not limited to, melamine, ammonium, and ethylene diamine. Suitable phosphorus or sulfur containing reactants include, but are not limited to, phosphoric acid and sulfonic acid.

The char catalyst is a component that often enhances the performance of the nitrogenous phosphate and/or sulfonate component and preferably is a char forming catalyst or a phase transfer agent or a combination of both. The char catalyst can be present in the flame retardant in any amount that provides the acceptable enhanced flame retardancy. As non-limiting examples, the flame retardant may be present in an amount up to about 5, about 8 or about 10 wt % or as little as about 0.01, about 0.1 or about 0.2 wt %. In some embodiments, both a char forming catalyst and a phase transfer catalyst are used together, and they together may be present in the flame retardant in an amount between about 0.1 to about 3.0, and more preferably 0.3 to about 2.5 wt %. Alternatively, amounts greater than 3.0 wt % may be used so long as the overall composition has the general characteristics described herein.

Although not wishing to be bound by any particular theory, it is believed that the char forming catalyst may act, at the time of decomposition of part of the system, to "grab onto" or react with decomposing molecules, thereby minimizing the production of low molecular weight components that can burn; this may enable the development of char rather than burn. Exemplary char forming catalysts include, but are not limited to, multi-cyclic compounds having at least one reactive group in each of at least two rings. Typically, the rings are joined together by atoms common to both rings. These may include spiro-compounds. The spiro compounds may define at least two heterocyclic ring structures, e.g., each ring structure includes oxygen, joined by at least one carbon atom common to both rings. In some embodiments, the char forming catalyst may be one or more spiro compounds or a material that includes a spiro moiety, e.g., one or more tetraoxaspiro materials, such as one or more 2,4,8,10-tetraoxa-spiro[5.5]undecane compounds and/or one or more 1,5,7,11-tetraoxa-spiro[5.5]undecane compounds.

In some embodiments, the char forming catalyst may be represented by the following formula I:

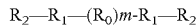

where m represents a number between 1 and 8, in some embodiments less than 3 or less than 2; $R_0$—independently represent a di- tri-, or quad-valent radical including, but not limited to, two independently substituted or unsubstituted, saturated or unsaturated heterocyclic ring structures joined by at least one common carbon atom and preferably no more than two, including, but not limited to, one, carbon atoms common to the heterocyclic ring structures; $R_1$—independently represents a bond; or a substituted or unsubstituted, saturated or unsaturated hydrocarbyl or heterocarbyl linking group, preferably a C1-C6 alkyl linking group, including, but not limited to, a C3 alkyl; and $R_2$—independently represents a terminal group, preferably a terminal amine, including, but not limited to, a primary amine.

Exemplary compounds include those in which the heterocyclic ring structure comprises at least two heteroatoms in at least two heterocyclic ring structures, and/or $R_0$ independently represents a divalent radical, preferably with at least one, for example, two (including two adjacent), heterocyclic ring structures being 6-member. These compounds may also include those in which the heteroatom in the heterocyclic rings is predominately oxygen.

The char catalyst may include those compounds having a molecular weight of at least about 180, preferably at least about 200 and/or a flash point of greater than about 200° C.

Some embodiments include one or more tetraoxaspiro materials, such as derivatives of a tetraoxaspiro undecane (e.g., amine derivatives), such as one or more 2,4,8,10-tetraoxa-spiro[5.5]undecane compounds and/or one or more 1,5,7,11-tetraoxa-spiro[5.5]undecane compounds. FIGS. 1A and 1B show exemplary 2,4,8,10-tetraoxa-spiro[5.5]undecane compounds (compounds 1, 2, 3, 4, 5, 6, 7), while FIG. 2 shows exemplary 1,5,7,11-tetraoxa-spiro[5.5]undecane compounds (compounds 10, 11 and 12). The char forming catalyst component may also include adducts, including, but not limited to, amine adducts, nitrile adducts (including 2-propenenitrile or acrylonitrile) and/or oxirane adducts (including butoxymethyl oxirane). 2,4,8,10-tetraoxaspiro[5.5]undecane-3,9-dipropanamine with an amine or nitrile adduct, such as acrylonitrile is a non-limiting example.

The phase transfer agent utilized can be or can include tetrahydrocarbyl ammonium salts, including, but not limited to, tetramethyl, tetraethyl, tetrapropyl, tetralkyl, and/or aryltrialkyl ammonium salt in which the salt is a bromide, chloride, hydroxide and/or hydrogen sulfate ammonium salt. Preferably, the phase transfer catalyst includes phosphate esters, tetraethylammonium bromide, tetraethylammonium hydroxide, tetrapropylammonium bromide, tetrabutyl ammonium bromide, tetrabutyl ammonium hydroxide, tetrabutyl ammonium hydrogen sulfate and/or benzyltriethyl ammonium chloride.

In some embodiments, a retardant may be prepared as follows:

To about 900 grams of water, while under agitation, add about 180 grams of ethylene diamine, about 60 grams of melamine and about 0.5 wt percent by finished recovered product of 2,4,8,10-tetraoxaspiro[5.5]undecane-3,9-dipropanamine adduct with 2-propenenitrile (acrylonitrile), which is commercially available from Ajinomoto, Inc. under the tradename YSE-CURE B-001. The mixture was warmed to about 170° F. and, while maintaining temperature, phosphoric acid is slowly added until a pH of 7.0 was reached. The mixture is cooled, filtered, dried and ground to recover the flame retardant.

One of ordinary skill can easily modify the above technique to achieve a preferred ratio of about 80:20 ethylene diamine phosphate to melamine phosphate.

This flame retardant can be present in amounts ranging from about 10 to about 85% by weight of the total composition, e.g., from about 10 to about 50% by weight, from about 25 to about 35% by weight or from about 10 to about 25% by weight. The char forming catalyst will therefore be present in the insulative wall in amounts ranging from about 0.15 weight percent to about 8.5 weight percent.

It is often preferable to add a thermoplastic elastomer compound to improve the elongation properties of the cable.

| PROPERTY | NOMINAL VALUE (Approximate) | UNITS | ASTM TEST METHOD |
|---|---|---|---|
| Melt Flow Rate 190° C./2.16 kg | 0.5 | g/10 min. | D 1238 |
| Density | 0.868 | g/cm³ | D 792 |
| Mooney Viscosity | 33 | ML 1 + 4 @ 121° C. | D 1646 |
| Tensile | | | |
| Yield | 9.5 | MPa | |
| Ultimate Elongation | 810 | % | D 638 |
| 100% Modulus | 2.6 | MPa | |
| Flexural Modulus | | MPa | D 790 |
| 1% Secant | 15.2 | | |
| 2% Secant | 14.4 | | |
| Tear Strength | 37.3 | kN/m | 37.3 |
| Vicat Softening Point | 46 | ° C. | D 1525 |

-continued

| PROPERTY | NOMINAL VALUE (Approximate) | UNITS | ASTM TEST METHOD |
|---|---|---|---|
| Hardness | | | D 2240 |
| Shore A | 15.2 | | |
| Shore B | 14.4 | | |
| Glass Transition | −52 | ° C. | |
| Melt Point | 55 | ° C. | |

These typical properties can be found in a material known as ENGAGE 8150 from The Dow Chemical Company, (Midland, Mich., USA), which is also known as an ethylene octene copolymer. The presence of the elastomer may range from about 15 to about 85 percent by weight of the total composition of the insulative wall. Satisfactory results can be achieved, e.g., at amounts in the ranges of about 15 to about 45 percent by weight, and about 20 to about 35 percent by weight. ENGAGE 8180, also obtained by Dow, works as well. Styrenic block copolymers, such as SEBS (Styrene-Ethylene-Butadiene-Styrene) and SBS (Styrene-Ethylene-Styrene) polymers work as well, which are available from KRATON and from GLS Corporation.

Other ingredients, such as fillers, and other processing aids, such as antioxidants (e.g., the Irganox family of antioxidants available from CIBA) may be of benefit. These other ingredients include, but are not limited to, hindered phenolic stabilizers like tetrakis((methylene(3,5-di-tert-butyl-4 hydroxyhydrocinnamate))methane (e.g., Ciba Specialty Chemicals Irganox 1010), acid scavengers and hydrotalcite-like materials (e.g., DHT 4A from Kyowa Chemicals), endothermic agents such as, but not limited to, magnesium hydroxide (e.g., FR-20 from Dead Sea Bromine Group), zinc borate and the like and UV absorbers from the benzophenone family.

A metal deactivator can be added, e.g., to improve long term heat stability of the compositions. Hydrotalcite is a typical deactivator. Hydrotalcite is a natural mineral with a white collar in pearl-like luster. Hydrotalcite is a compound of magnesium and aluminum with a layer structure of the following formula composition's DHT-4A available from Mitsui, Japan, is a preferred metal deactivator. DHT-4A $\{Mg_{4.3}Al_2(OH)_{12.6}CO_3\text{-}mH_2O\}$ is a hydrotalcite-like compound used as a stabilizer (halogen scavenger) for polyolefin and other plastics. Hydrotalcite $\{Mg_6Al_2(OH)_{16}CO_3\text{-}4H_2O\}$ is a natural mineral that is mined.

1,2-bis(3,5-di-tert-butyl-4hydroxyhydrocinnamoyl)hydrazine (available as Irganox MD1024 from CIBA-Giegy, Switzerland) is another metal de-activator. The role of the metal deactivator is, e.g., to quench the activity of the metal catalyst(s) often found in thermoplastics and to quench the activity of a metal conductor at the interface of the conductor and the insulative wall.

Figure 3:
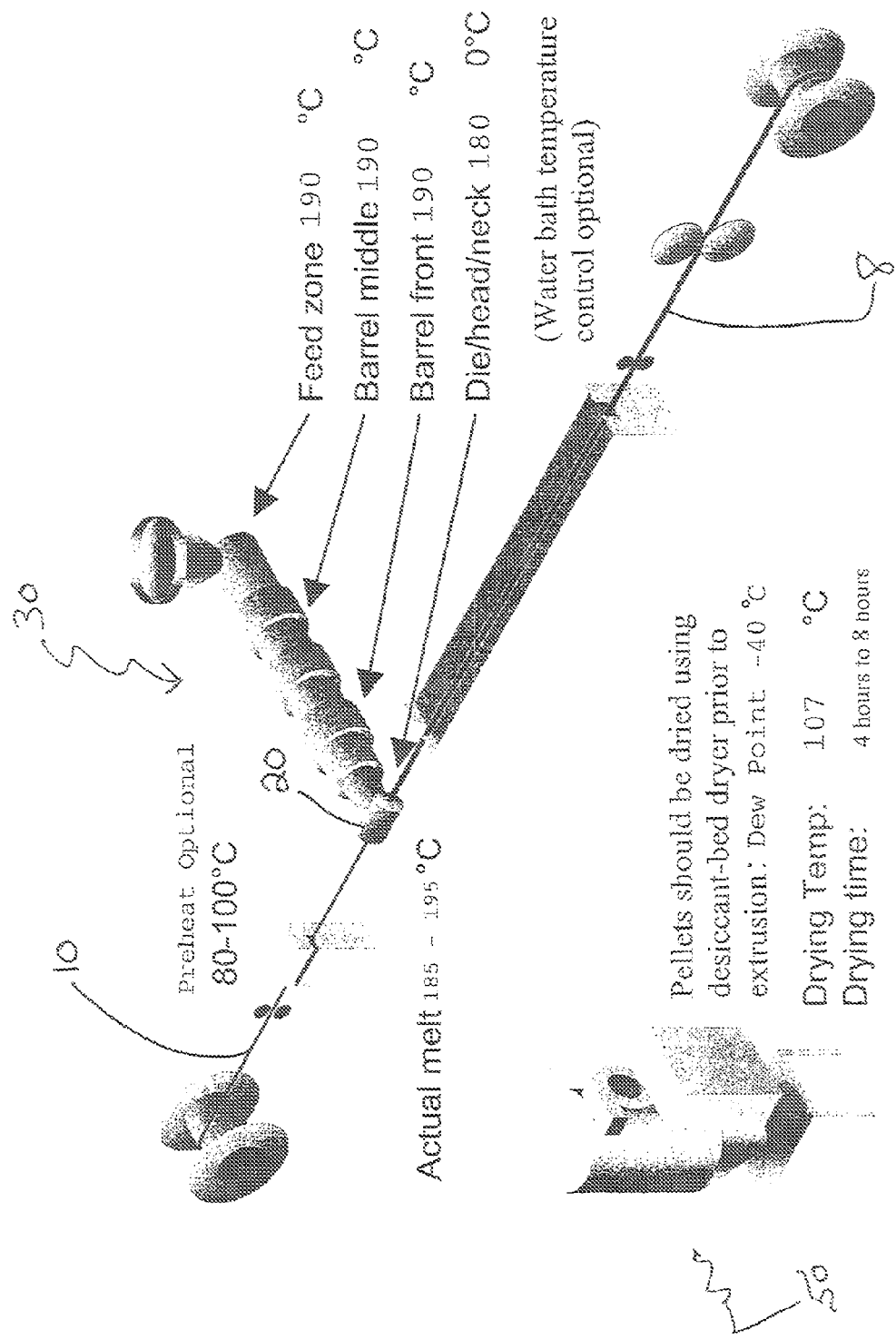
FIG. 3 is a schematic perspective view from above of a wire coating operation.

Cable 8 can be manufactured using the process shown in FIG. 3. In FIG. 3, wire 10 (more generally, a conductor) is passed through a die 20 containing the material for the insulative wall. If desired, the materials may be pre-compounded and then fed to the die through an extruder 30 or the materials may be introduced into the extruder, with the compounding taking place in the extruder. For some materials, drying may be necessary, such as drying in a desiccant-bed dryer 50, such as one having a dewpoint of less than about −40° C.

In general, the composition used in the insulative coating is prepared by mixing the polymeric ingredients and optional additives by use of conventional masticating equipment, including, but not limited to, a thermoplastic elastomer meld, Brabender mixer, Banbury mixer, Buss-co kneader, Farrel continuous mixer, twin screw continuous mixer, or any other mixing apparatuses, such as an extruder. Mixing time should be sufficient to obtain homogeneous or substantially homogeneous blends and reaction between the thermoplastic, e.g., polypropylene, flame retardant composition, and thermoplastic elastomer. Satisfactory mixing time is dependent upon the time of the mixing equipment (shear intensity and temperature). Typically, mixing times of about 3 to about 5 minutes are satisfactory on a batch mixer, while about 1 to about 2 minutes are satisfactory on a continuous mixer. If the polymer blend is obviously non-homogeneous or substantially non-homogeneous, additional mixing may be required.

The insulative wall of the cable may be of varying thicknesses. The thickness is measured as taught in ISO 6722:2002 (E).

Depending upon the conductor size, the insulative wall is categorized based upon its thickness. Thick wall insulation ranges from about 0.48 mm to about 1.60 mm. Thin wall insulation ranges from about 0.20 mm to about 0.65 mm. Ultra thin wall insulation ranges from about 0.10 mm to about 0.44 mm, with about 0.12 mm to about 0.32 mm being preferred, and about 0.16 mm to about 0.25 mm being more preferred.

It is believed that the compositions disclosed herein are also useful when formed into fibers used in items such as carpets, fabrics, walls, clothing, and other textile products.

EXAMPLES

The disclosure is further described in the following examples, which do not limit its scope. It will be clear to one of ordinary skill that the amount and type of ingredients can be varied and still be within the scope of the embodiments described herein.

Samples/Material

Three pre-mixed lots of the composition in Table I were made in a Buss kneader and pelletized in the following proportions:

TABLE I

| Material | Lot 1 Wt % (Approximate) | Lot 2 Wt % (Approximate) | Lot 3 Wt % (Approximate) |
|---|---|---|---|
| Polypropylene (Huntsman 18S2A) | 42.2 | 42.7 | 42.4 |
| Ethylene Octene Copolymer (ENGAGE 8150) | 24.0 | 24.0 | 24.0 |
| Flame Retardant, including about 74.85% by weight ethylene diamine phosphate, about 24.85% by weight melamine phosphate with about 0.3% by weight char catalyst and about 0.1% by weight phase transfer catalyst | 31.0 | 31.0 | 31.0 |
| Silicone | | | 0.30 |
| Irganox 1010 | 0.50 | 0.50 | 0.50 |
| Mitsui DHT-4A | 0.50 | 0.50 | 0.50 |
| Irganox MD 1024 | 0.30 | 0.30 | 0.30 |

TABLE I-continued

| Material | Lot 1 Wt % (Approximate) | Lot 2 Wt % (Approximate) | Lot 3 Wt % (Approximate) |
|---|---|---|---|
| Acrawax C | 0.50 | | |
| $TiO_2$ (Dupont Ti Pure R-1030) | 1.0 | 1.0 | 1.0 |

These pellets were then dried and the cable made as discussed above in reference to FIG. 3. One will recognize that the temperatures and profile of the extrusion will change depending upon the formulation.

The cable was then tested according to ISO 6722:2002 (E). The results are shown in Tables IIA and IIB (below).

TABLE IIA

SAMPLE 1

| TEST | RESULT |
|---|---|
| Withstand voltage of 1 kv for 30 minutes | |
| Pressure test at high temperature at 125° C. for 4 hours (withstand voltage) | Passed |
| Strip force (lb) | 7.95 |
| Winding at −25° C. for 4 hours (mandrel 15 mm, 2 turns) | Passed |
| Resistance to abrasion sandpaper, minimum mm (Mass. 0.18 kg) | |
| Short-term aging at 150° C. for 240 hours (mandrel 15 mm, 2 turns) | Passed |
| Long-term aging at 125° C. for 3000 hours (mandrel 15 mm, 2 turns) | Passed |
| Shrinkage by heat at 150° C. for 15 minutes (mm maximum) | 0.72 |
| Gasoline compatibility at 23 +/− 5° C. for 20 hours (% maximum) | 0.68 |
| Diesel fuel compatibility at 23 +/− 5° C. for 20 hours (% maximum) | 7.17 |
| Engine oil compatibility at 50 +/− 3° C. for 20 hours (% maximum) | 5.74 |
| Ethanol compatibility at 50 +/− 3° C. for 20 hours (% maximum) | 1.09 |
| Power steering fluid compatibility at 50 +/− 3° C. for 20 hours (% maximum) | 13.85 |
| Automatic transmission fluid compatibility at 50 +/− 3° C. for 20 hours (% maximum) | 16.27 |
| Engine coolant compatibility at 50 +/− 3° C. for 20 hours (% maximum) | 0.12 |
| Battery acid compatibility at 23 +/− 5° C. for 20 hours (% maximum) | 0.00 |
| Resistance to flame propagation 15 seconds | Passed |
| Outside cable diameter, (maximum mm) | 2.478 |
| Insulative wall thickness nominal (mm) | 0.345 |
| Insulative wall thickness minimum (mm) | 0.292 |

TABLE IIB

Sample 2

| TEST | RESULT |
|---|---|
| Withstand voltage of 1 kv for 30 minutes | |
| Pressure test at high temperature and 125° C. for 4 hours (withstand voltage) | From three samples, 1 pass |
| Strip force (LB) | 8.80 |
| Winding at −25° C. for 4 hours (mandrel 15 mm, 2 turns) | Passed |
| Resistance to abrasion sandpaper, minimum mm (Mass. 0.18 kg) | |
| Short-term aging at 150° C. for 240 hours (mandrel 15 mm, 2 turns) | Passed |
| Long-term aging at 125° C. for 3000 hours (mandrel 15 mm, 2 turns) | Passed |
| Shrinkage by heat at 15° C. for 15 minutes (mm maximum) | 1.054 |
| Gasoline compatibility at 23 +/− 5° C. for 20 hours (% maximum) | 0.85 |
| Diesel fuel compatibility at 23 +/− 5° C. for 20 hours (% maximum) | 7.39 |
| Engine oil compatibility at 50 +/− 3° C. for 20 hours (% maximum) | 8.42 |
| Ethanol compatibility at 50 +/− 3° C. for 20 hours (% maximum) | 0.30 |
| Power steering fluid compatibility at 50 +/− 3° C. for 20 hours (% maximum) | 13.62 |
| Automatic transmission fluid compatibility at 50 +/− 3° C. for 20 hours (% maximum) | 14.96 |
| Engine coolant compatibility at 50 +/− 3° C. for 20 hours (% maximum) | 0.43 |
| Battery acid compatibility at 23 +/− 5° C. for 20 hours (% maximum) | 0.00 |
| Resistance to flame propagation 15 seconds | Passed |
| Outside cable diameter, (maximum mm) | 2.367 |
| Insulative wall thickness nominal (mm) | 0.294 |
| Insulative wall thickness minimum (mm) | 0.255 |

Test Methods

Insulative Wall Thickness

The following insulative wall thickness test was used:

Prepare three test samples, each having a thin cross-section of insulation, taken at about 1 m intervals from a cable sample about 3 m in length. Strip the insulation from the cable. Take care not to deform the test samples during the preparation process. If cable marking causes indentation of the insulation, take the first test sample through this indentation. Use a measuring device that does not cause deformation. Place the test sample under the measuring equipment, with the plane of the cut perpendicular to the optical axis. The measurement accuracy shall be +/−0.001 mm.

Thin Insulative Wall Flame Propagation Test

The following flame propagation test was used. A sample of at least about 600 mm of insulation was obtained and suspended in a draft-free chamber and exposed to the tip of the inner cone of the flame of a Bunsen burner having a combustion tube of about 9 mm internal diameter and flame height of about 100 mm with the length of the blue cone of the flame being about 50 mm.

The flame was applied at about 500+/−5 mm from the upper end of the insulation until the conductor became visible or else after about 15 s for cable with conductor sized ≦about 2.5 $mm^2$ and after about 30 s for cable with the conductor sizes>about 2.5 $mm^2$. The time for the insulation to extinguish was measured as well as the amount of insulation at the top of the test sample.

A number of embodiments have been described. Nevertheless, it will be understood that various modifications may be made without departing from the spirit and scope thereof, and accordingly, reference should be made to the appended claims, rather than to the foregoing specification. Other embodiments are within the scope of the following claims.

What is claimed is:

1. A cable comprising: a conductor core; and an insulative wall, the insulative wall having a thickness of from about 0.10 mm to about 0.44 mm, wherein when the cable is tested using the Thin Insulative Wall Flame Propagation Test, a combustion flame of the insulative wall extinguishes within 70 seconds and a minimum of 50 mm of insulative wall at a top of a test sample remains unburned, and wherein at least 20% by weight of the total composition of the insulative wall is a polyamide comprising a repeating unit of amino caproic acid or A-D, wherein A is a residue of a dicarboxylic acid selected from the group consisting of adipic acid, isophthalic acid, terephthalic acid, 1,4-cyclohexanedicarboxylic acid, rescorcinol dicarboxylic acid, naphthalenedicarboxylic acid, and mixtures thereof, and wherein D is a residue of a diamine selected from the group consisting of m-xylylene diamine, p-xylylene diamine, hexamethylene diamine, ethylene diamine, or 1,4 cyclohexanedimethylamine, and mixtures thereof.

2. The cable of claim 1, wherein the insulative material further comprises a compound selected from the group consisting of a nitrogenous phosphate and a nitrogenous sulfonate, and mixtures thereof.

3. The cable of claim 1, wherein the insulative material further comprises an ethylene diamine phosphate.

4. The cable of claim 1, wherein the insulative wall further comprises a hydrotalcite or hydrotalcite-like compound.

5. The cable of claim 1, wherein the insulative wall further comprises 1,2bis(3,5-di-tert-butyl-4-hydroxyhydrocinnamoyl)hydrazine.

6. A cable comprising: a conductor core; and an insulative wall, the insulative wall having a thickness of from about 0.10 mm to about 0.44 mm, wherein when the cable is tested using the Thin Insulative Wall Flame Propagation Test, a combustion flame of the insulative wall extinguishes within 70 seconds and a minimum of 50 mm of insulative wall at a top of a test sample remains unburned, and wherein at least 20% by weight of the total composition of the insulative wall is a thermoplastic selected from the group consisting of polyesters, polyamides, polylactic acids, polyolefins, and blends thereof, and wherein the insulative wall contains a flame retardant material selected from the group consisting of a nitrogenous phosphate and a nitrogenous sulfonate, and mixtures thereof.

7. The cable of claim 6, wherein the thermoplastic is a polyolefin.

8. The cable of claim 6, wherein the insulative further comprises ethylene diamine phosphate.

9. The cable of claim 6, wherein the insulative wall further comprises a hydrotalcite or hydrotalcite-like compound.

10. The cable of claim 6, wherein the insulative wall further comprises 1,2-bis(3,5-di-tert-butyl-4-hydroxyhydrocinnamoyl)hydrazine.

11. A cable comprising: a conductor core; and an insulative wall, the insulative wall having a thickness of from about 0.10 mm to about 0.44 mm, wherein when the cable is tested using the Thin Insulative Wall Flame Propagation Test, a combustion flame of the insulative wall extinguishes within 70 seconds and a minimum of 50 mm of insulative wall at a top of a test sample remains unburned, and wherein at least 20% by weight of the total composition of the insulative wall is a thermoplastic selected from the group consisting of polyesters, polyamides, polylactic acids, polyolefins, and blends thereof, and wherein the insulative wall contains ethylene diamine phosphate.

12. The cable of claim 11, wherein the thermoplastic is a polyolefin.

13. The cable of claim 11, wherein the insulative wall further comprises a compound selected from the group consisting of nitrogenous phosphate and a nitrogenous sulfate, and mixtures thereof.

14. The cable of claim 11, wherein the insulative wall further comprises a hydrotalcite or hydrotalcite-like compound.

15. The cable of claim 11, wherein the insulative wall further comprises 1,2-bis(3,5-di-tert-butyl-4-hydroxyhydrocinnamoyl)hydrazine.

16. A cable comprising: a conductor core; and an insulative wall, the insulative wall having a thickness of from about 0.10 mm to about 0.44 mm, wherein when the cable is tested using the Thin Insulative Wall Flame Propagation Test, a combustion flame of the insulative wall extinguishes within 70 seconds and a minimum of 50 mm of insulative wall at a top of a test sample remains unburned, and wherein at least 20% by weight of the total composition of the insulative wall is a thermoplastic selected from the group consisting of polyesters, polyamides, polylactic acids, polyolefins, and blends thereof, and wherein the insulative wall further comprises a hydrotalcite or hydrotalcite-like compound.

17. The cable of claim 16, wherein the thermoplastic is a polyolefin.

18. The cable of claim 16, wherein the insulative wall further comprises ethylene diamine phosphate.

19. The cable of claim 16, wherein the insulative wall further comprises a compound selected from the group consisting of nitrogenous phosphate and a nitrogenous sulfate, and mixtures thereof.

20. The cable of claim 16, wherein the insulative wall further comprises 1,2-bis(3,5-di-tert-butyl-4-hydroxyhydrocinnamoyl)hydrazine.

21. A cable comprising: a conductor core; and an insulative wall, the insulative wall having a thickness of from about 0.10 mm to about 0.44 mm, wherein when the cable is tested using the Thin Insulative Wall Flame Propagation Test, a combustion flame of the insulative wall extinguishes within 70 seconds and a minimum of 50 mm of insulative wall at a top of a test sample remains unburned, and wherein at least 20% by weight of the total composition of the insulative wall is a thermoplastic selected from the group consisting of polyesters, polyamides, polylactic acids, polyolefins, and blends thereof, and wherein the insulative material further comprises 1,2-bis(3,5-di-tert-butyl-4-hydroxyhydrocinnamoyl)hydrazine.

22. The cable of claim 21, wherein the thermoplastic is a polyolefin.

23. The cable of claim 21, wherein the insulative wall further comprises ethylene diamine phosphate.

24. The cable of claim 21, wherein the insulative wall further comprises a hydrotalcite or hydrotalcite-like compound.

25. The cable of claim 21, wherein the insulative wall further comprises a compound selected from the group consisting of nitrogenous phosphate and a nitrogenous sulfate, and mixtures thereof.

* * * * *